United States Patent [19]

Eckart et al.

[11] 4,307,436
[45] Dec. 22, 1981

[54] POWER DISTRIBUTION CENTER

[75] Inventors: George R. Eckart, Arlington Heights, Ill.; Louis A. DeBeradinis, Stamford, Conn.

[73] Assignee: Daniel Woodhead, Inc., Northbrook, Ill.

[21] Appl. No.: 81,632

[22] Filed: Oct. 4, 1979

[51] Int. Cl.³ .............................................. H02B 1/04
[52] U.S. Cl. .................................... 361/363; 174/38; 361/334; 361/426; 361/357
[58] Field of Search .................... 174/38, 60; 361/331, 361/332, 334, 356, 357, 358, 360, 363, 426, 427, 428, 429, 424

[56] References Cited

U.S. PATENT DOCUMENTS

| | | | |
|---|---|---|---|
| 2,603,546 | 7/1952 | Lois | 361/357 |
| 3,153,116 | 10/1964 | Phillips | 174/38 |
| 3,259,808 | 7/1966 | Gramlich | 361/334 |
| 3,760,234 | 9/1973 | Jones | 174/38 |
| 3,991,264 | 11/1976 | Connell | 361/334 |

*Primary Examiner*—Gerald P. Tolin
*Attorney, Agent, or Firm*—Emrich, Root, O'Keeffe & Lee

[57] ABSTRACT

A power distribution center, particularly adapted for use at marinas, trailer camps and the like, comprises a vertically extending housing adapted to receive power feeder cables from an external power source, which cables are connected to appropriate terminal blocks mounted within the housing. The housing has mounted on the outer surfaces thereof one or more electrical receptacles, the terminals of which are connected to the appropriate terminal blocks within the housing by electrical conductors, and which are adapted to receive plugs of electrical cable, thereby to carry electrical current to power operated equipment. There are also mounted in association with each receptacle an appropriate type of circuit breaker.

7 Claims, 3 Drawing Figures

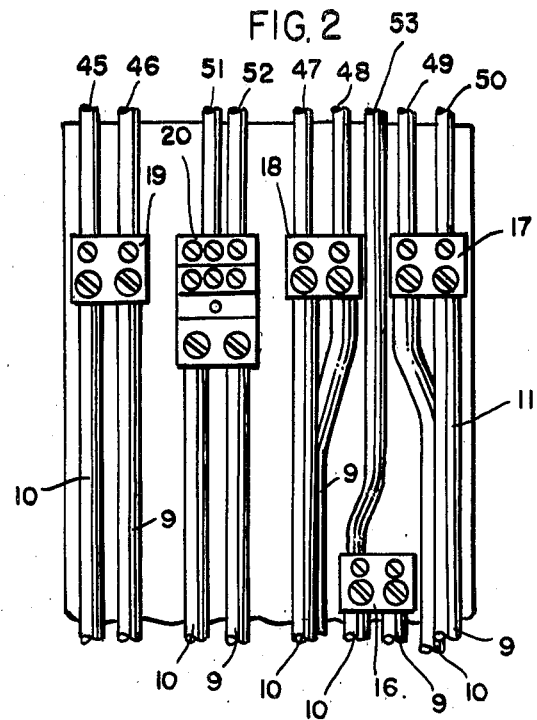
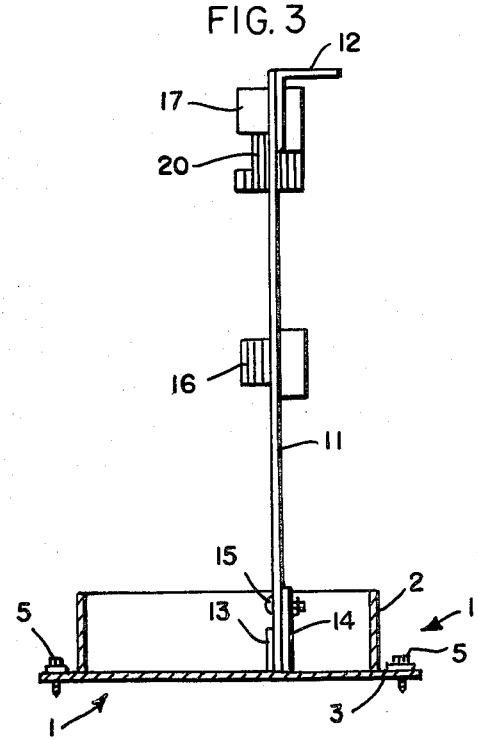

POWER DISTRIBUTION CENTER

BACKGROUND OF THE INVENTION

The power distribution center of the present invention is particularly useful at marinas where boat operators desire to use electrical power furnished at the dock while the boats are docked at the pier. The invention is also useful in other areas such as, for example, trailer camps or other areas where vehicle owners want to use electrical power from an external source while the vehicle is parked.

Heretofore it has been necessary for the persons furnishing the power, such as the dock owner, to first erect a support on the dock which took the form of a board extending upwardly from the dock and secured thereto by nails, screws and the like. A junction box then had to be separately mounted on the lower part of the board to which cables were connected from the power supply. An electrical receptacle was then mounted on the support as a second element above the junction box to which were connected the terminals from the junction box. Then when a boat or other vehicle, parked next to the junction box, needed external electrical power a suitable cable was plugged into the receptacle. Usually the junction box had to be purchased from a manufacturer different from the one which made the receptacle.

With such an arrangement, if it was desirable for a light to be provided for boats or other vehicles parked at night, it was necessary to mount a lamp socket on the support for connection to the junction box.

The fact that all of these elements were separate resulted in a very time-consuming job to assemble them and mount them separately at the dock site, and connect them electrically.

The present invention eliminates the problems of assembly heretofore encountered, and simplifies the job of providing a power distribution center where boats are docked or where other vehicles may be parked for any length of time.

BRIEF SUMMARY OF THE INVENTION

The invention relates in general to a power distribution center particularly adapted for use at marinas, trailer camps and other areas for supplying electrical power to boats and other vehicles while parked, for operating electrical equipment.

More particularly the invention relates to a power distribution center which is so constructed as to be readily assembled and connected for use in a relatively short time.

A base member, having openings therethrough to receive power feeder cables from a source of electrical power, is readily mounted on a support, such as a pier for boats, and has a mounting board secured thereto and extending upwardly therefrom. A plurality of terminal blocks and ground connections are already mounted on said board, and the electrical conductors from said power supply cable extending through said base from the power supply source and readily connected to the appropriate terminal blocks.

To complete the installation a housing is placed over the mounting board and secured to the base. Electrical receptacles adapted to receive electric plugs are already mounted on the surface of the housing, together with their associated circuit breakers, and electrical wires are connected to the terminals of said receptacles within the housing. An access opening is provided in the wall of the housing having a removable closure member so that, after the housing is in place, a workman can reach through the access opening and connect the wires from the receptacle terminal to the other side of the appropriate terminal block and the power distribution center is ready for use.

In the light of the foregoing it is the principal object of the present invention to provide a power distribution center for providing power to parked vehicles, such as boats docked at a pier, vehicles parked at a camp site and the like.

Another object is to provide a power distribution center which is partially pre-assembled and connected at the factory, and the complete assembly of which may be readily accomplished at the site when it is to be used.

Other objects and advantages of the invention will appear more fully hereinafter as the description proceeds.

DESCRIPTION OF THE DRAWINGS

FIG. 2 is a fragmentary enlarged elevational view of the mounting board showing the wire connections, and FIG. 3 is a vertical sectional view through the base of the power distribution center showing the mounting board and the terminal blocks thereon in side elevation.

DETAILED DESCRIPTION OF THE INVENTION

Figure 1:
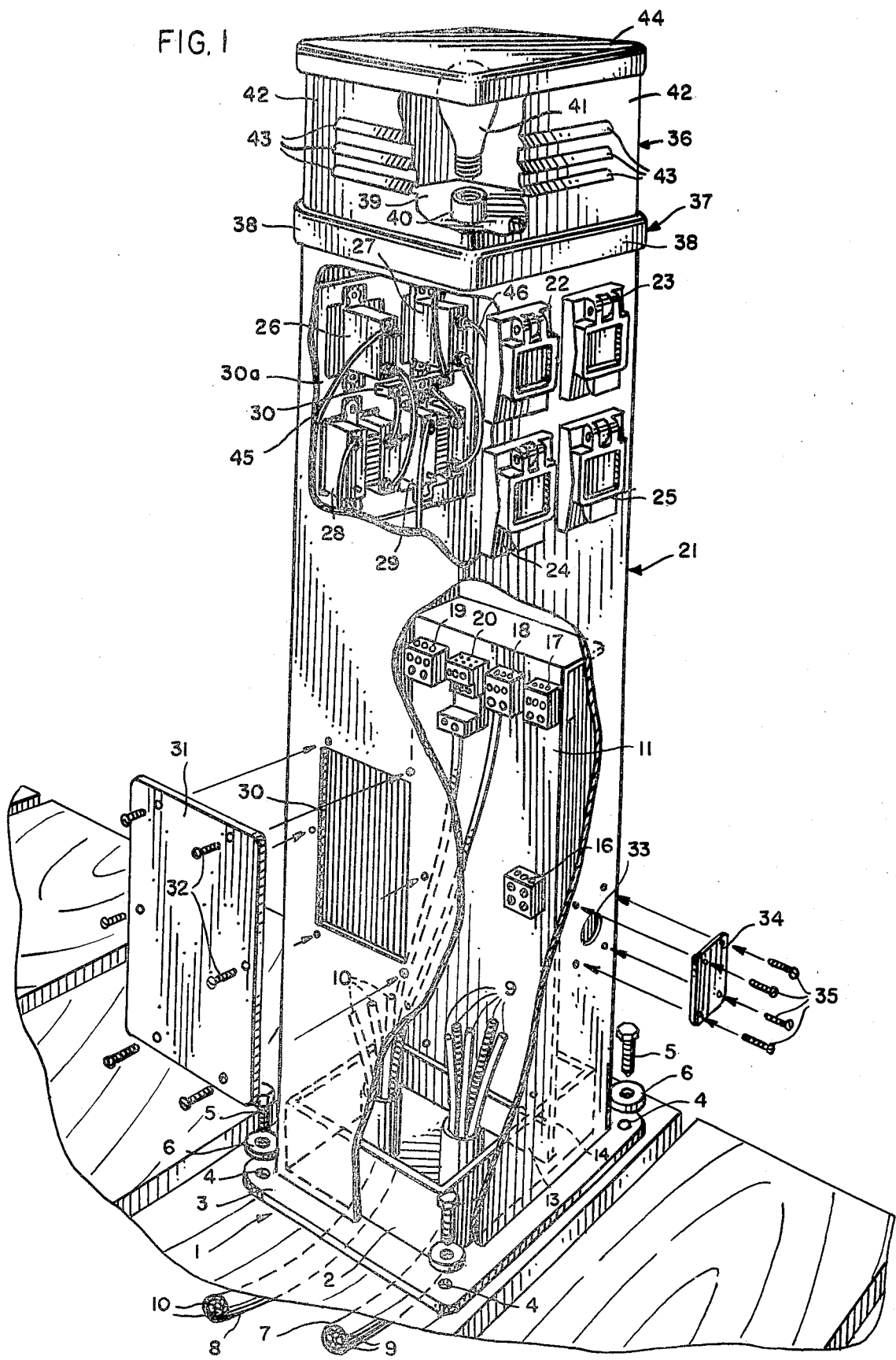
FIG. 1 is an exploded perspective view of a preferred form of the power distribution center of the present invention with parts broken away for the sake of clarity.

Referring now more particularly to the drawings and especially to FIGS. 1 and 3, the power distribution center of the present invention comprises a base member generally indicated by the numeral 1, provided with a plurality of upstanding sides 2. Any suitable number of sides may be utilized, however, the preferred form provides for a square or rectangular configuration, so that there are illustrated herein four such sides indicated by the numeral 2. Extending outwardly from the lower edge of the upstanding sides 2 are the flanges 3 provided with a plurality of openings 4 through which the mounting bolts 5 may extend through washers 6 and into the pier or other suitable support for the distribution center.

Two power feeder cables or conduits 7 and 8 are provided, one of which extends from a suitable source of electrical power (not shown) and upwardly through the base member as shown in FIG. 1, and the other of which extends from the terminal blocks to another power distribution assembly. The feeder cable or conduit 7 is provided therein with a plurality of conductors 9 and the cable or conduit 8 also has a plurality of conductors 10 extending therethrough and outwardly at the inner ends of the cables as also illustrated in FIG. 1.

As will be explained more fully hereinafter, the particular system illustrated is a five-wire system wherein each of the cables is provided with five conductors, three of which are hot wires, one is neutral, and one is ground. In this system the wires 9 are connected to the terminal blocks at one end thereof and carry current from the external source of power. The wires 10 of the cable or conduit 8 are connected to the terminal blocks at one end thereof and to the terminal blocks of another power distribution assembly, whereupon the terminal blocks of the first power distribution assembly become the power source for the next power distribution assembly.

A mounting board 11 extends upwardly from the base member 1 and within the upstanding sides 2 thereof. Adjacent the upper end of the mounting board there is provided a shield 12 which is in the form of an angle member, for the purpose of isolating the low voltage wiring area for communication equipment, as will appear more fully hereinafter. As may be noted more clearly from FIG. 3, the base member 1 is provided with the two spaced upstanding support members 13 and 14 extending transversly of the base within the sides 2 and which receive the lower end of the mounting board 11 therebetween. A plurality of bolts 15 secure the lower end of the mounting board to the upstanding support member 14.

The mounting board has secured thereto a plurality of terminal blocks in any suitable number to accomodate the number of feeder cables. The ground terminal block is indicated by the numeral 16 and adjacent the upper end of the mounting board 11 there are the terminal blocks indicated at 17, 18, 19 and 20.

The terminal blocks 17, 18 and 19 are for the hot wires to be connected thereto, while the terminal block 20 is provided for the neutral wires to be connected thereto. As mentioned before, the number of these terminal blocks may be varied to suit specific number of feeder cables or conduits, depending upon the particular wiring system being used.

As mentioned above, the hot wires of the wires 9 furnish the incoming current from the external power source to the terminal blocks 17, 18 and 19, while the hot wires of the wires 10 furnish current from the hot wire terminal blocks 17, 18 and 19 to corresponding hot wire terminal blocks in a second power distribution assembly. Likewise the neutral and ground wires of the wires 9 connect to the neutral and ground terminal blocks 20 and 16 respectively and the neutral and ground wires of the wires 10 run from the terminal blocks 20 and 16 respectively to the corresponding terminal blocks of the next distribution assembly.

The distribution center is also provided with an upstanding enclosure or housing generally indicated by the numeral 21. The particular wiring system illustrated herein provides for four receptacles adapted to receive plugs from electrical equipment, and four circuit breakers, one associated with each receptacle. The circuit breakers 22 and 23 are associated with and connected to the receptacles 24 and 25. On the opposite side of the housing there is shown the circuit breakers 26 and 27 which are associated with and connected to the electrical receptacles 28 and 29 respectively.

When the distribution center is completely connected and ready for use, the appropriate wires 9 and 10 are connected to one side of the appropriate terminal block. The other side of the terminal blocks are then connected appropriately to the respective receptacle or circuit breaker.

For example, hot wires are connected from the appropriate hot wire terminal blocks 17, 18 and 19 to the circuit breakers, as heretofore identified, and from each circuit breaker to its associated receptacle. The neutral wires will extend from the terminal block 20 to the receptacles. In the case of the ground wires, they will each be connected from the receptacles to a grounding bar or bars 30 within the housing 21, secured to a mounting place 30a having suitable openings therethrough for the receptacles and circuit breakers. Only a single ground wire needs to extend from each bar 30 to the grounding terminal block 16.

When the power distribution center is installed, the base member is first secured to a suitable support such as the pier shown in FIG. 1 and the power feeder cables 7 and 8 are then fed upwardly through openings in the bottom of the base member as shown in FIG. 1. Since the mounting board 11 is secured to, or is an integral part of, the base member when it is being secured to its support, it is a relatively simple matter to connect the appropriate wires 9 and 10 to the appropriate terminal blocks as heretofore described. When this has been completed, the housing is then placed over the base member and its upstanding sides and is secured thereto at the power end thereof.

One side of the housing is provided with an access opening normally covered by the access panel 31 which is secured to the housing by suitable screws 32. The person installing the distribution center may then reach through the access opening and reach the appropriate wires from the receptacles and circuit breakers to attach them to the appropriate terminal blocks as heretofore described. When all of the appropriate connections have been made the access panel 31 may then be replaced.

In certain instances it may also be desirable to provide a power distribution center with low voltage communications equipment, such as a telephone, and if this is desired, an opening 33 may be provided in the wall of the housing to provide an outlet for such equipment. In the event that such equipment is not desired, then the opening 33 may conveniently be covered by a cover plate 34 and secured to the housing by means such as the screws 35.

In some instances it may also be desirable to provide a light source for the convenience of vehicle owners who may wish to use the power source at night. For this purpose there may be provided a lamp housing 37 having a base portion generally indicated at 38, which preferably has downwardly extending flanges 39 around the base and of such a size as to fit snugly over the top of the housing 21. The bottom of the lamp housing is provided with a lamp socket 40 adapted to receive the lamp 41. The wires from the lamp socket 40 will also extend and be connected to the appropriate terminal blocks.

The lamp housing 37 is provided with the sides 42 which have louvres 43 therein so that, when the lamp 41 is lit, the light may shine downwardly through the louvres 43. The lamp housing may then be provided with a cover 44, which is preferably removable so that access may be had to the lamp 41 for replacement purposes.

Referring to FIG. 2, this illustrates the wiring of a five-wire system in the area of the mounting board 11. It will be noted that the three hot wires of the group of wires 9 from the external power source are connected to the lower terminals at one side of each of the terminal blocks 17, 18 and 19. Each of the three hot wires of the group of wires 10 is also connected to the lower terminal on the other side of each of the terminal blocks 17, 18 and 19, but from there they extend to another one of the power distribution centers. The neutral wires of the groups 9 and 10 are connected to the lower terminals of the terminal block 20. The ground wire of each of the groups of wires 9 and 10 is connected to the ground terminal block 16. The neutral and ground wires of the groups of wires 10 will also extend to the neutral and ground terminal blocks in the next power distribution center. Thus there may be as many of these power distribution center assemblies as desired, all connected in series.

As may also be seen in FIG. 2, the hot wires 45 and 46 from the hot wire terminal block 19, the hot wires 47 and 48 from the hot wire terminal block 18, and the hot wires 49 and 50 from the hot wire terminal block 17 will extend therefrom and be connected to the appropriate circuit breakers heretofore described. The neutral wires 51 and 52 will extend from the neutral wire terminal block 20 to the appropriate receptacle. Obviously, there may be as many of these wires as is necessary to accomodate the number of electrical receptacles on the housing.

The ground wire 53 will extend from the suitable grounding bar within the housing and be connected to the ground terminal block 16 as shown.

It is evident from the foregoing description that we have provided a novel construction of power distribution center particularly adapted for use in connection with boats at marinas and vehicles at camp sites and the like, which not only simplifies the job of installation, but also presents a neat appearance as distinguished from the exposed junction boxes, electrical receptacles, circuit breakers and the like which have heretofore been used. The terminal blocks on the mounting board enable the assembly to function both as a junction box and as a power distribution center. Also, due to this arrangement of terminal blocks it is possible to handle all types of receptacles with varying amperages and voltage ratings. Furthermore, the arrangement is convenient because the manufacturer of the receptacles does not usually sell the junction box.

Changes may be made in the construction and arrangement of the various parts from those disclosed herein, without departing from the spirit of the invention or sacrificing any of the attendant advantages thereof, provided, however, that such changes fall within the scope of the appended claims.

We claim:

1. In a power distribution center assembly adapted for use in distributing electrical power to electrical equipment in boats, campers and the like, the combination comprising:
    a first subassembly including
        a base member;
        a mounting board secured to said base member and extending in an upward direction away therefrom;
        and at least first, second and third terminal blocks mounted on said mounting board;
        said first subassembly being mounted on a support and said base member being adapted for securing said first subassembly to the support, and said base member having an opening receiving a group of power feeder wires from a source of electrical power, said group of wires including a hot wire, a neutral wire and a ground wire which are connected to respective ones of said first, second and third terminal blocks;
    and a second subassembly including
        a housing; one wall of said housing having an access opening;
        an access cover plate removably secured to said one wall for normally closing said access opening;
        and a plurality of electrical receptacles mounted on said housing, each of said receptacles having electrical terminals located within said housing and an outlet portion accessible from the exterior of said housing and adapted to receive the plug of an electrical cable;
        said second subassembly being removably mounted on said first subassembly with said housing being supported on said base member and enclosing said mounting board, said first, second and third terminal blocks and said group of wires,
        said base member having a vertically extending peripheral wall which is received in telescopic engagement with the lower wall portion of said housing when the housing and said base member are assembled together, and said access cover plate being removable to provide access to said mounting board, said first, second and third terminal blocks and said terminals of said receptacles from the exterior of said housing while said housing is mounted in said base plate to permit the connection of wires between said terminals of said receptacles and appropriate ones of said first, second and third terminal blocks.

2. The power distribution center assembly defined in claim 1, wherein said base member is multi-sided and includes an outwardly extending flange on the bottom thereof provided with openings therethrough to receive fastening means for securing the base member to said support.

3. The power distribution center assembly defined in claim 1, including a lamp housing mounted on the upper end of said first named housing, a lamp receptacle in said lamp housing having lamp terminals thereon, and electrical conductors connected between said lamp terminals and one of said terminal blocks.

4. The power distribution center assembly defined in claim 1, including a second opening in a wall of said housing adapted to receive a receptacle for low voltage communications equipment.

5. The power distribution center assembly defined in claim 1, and a shield member adjacent the upper end of said mounting board for isolating an area of said housing in which low voltage communications equipment may be located.

6. The power distribution center assembly defined in claim 1 wherein said second subassembly further comprises a plurality of circuit breakers mounted on said housing, including a separate circuit breaker associated with each of said receptacles and electrically interconnected with its associated receptacle.

7. In a power distribution center assembly adapted for use in distributing electrical power to electrical equipment in boats, campers and the like, the combination comprising:
    a first subassembly including
        a base member;
        a mounting board secured to said base member and extending in an upward direction away therefrom;
        a shield member secured to said mounting board at the upper end thereof;
        and at least first, second and third terminal blocks mounted on said mounting board;
        said first subassembly being mounted on a support and said base member being adapted for securing said first subassembly to the support, and said base member having an opening receiving a group of power feeder wires from a source of electrical power, said group of wires including a hot wire, a neutral wire and a ground wire which are connected to respective ones of said first, second and third terminal blocks;

and a second subassembly including a housing: one wall of said housing having an access opening;

an access cover plate removably secured to said one wall for normally closing said access opening;

and a plurality of electrical receptacles mounted on said housing, each of said receptacles having electrical terminals located within said housing and an outlet portion accessible from the exterior of said housing and adapted to receive the plug of an electrical cable;

said second subassembly being removably mounted on said first subassembly with said housing being supported on said base member and enclosing said mounting board, said first, second and third terminal blocks and said group of wires, said terminals of said receptacles being located at points above the upper end of said mounting board, and said mounting board being rectangular in shape and when said housing is assembled on said base member, said mounting board dividing the area within said housing into first and second compartments with said terminal blocks being located in said first compartment, said shield member being generally rectangular in shape and extending perpendicular to said mounting board, substantially enclosing said second compartment;

said base member having a vertically extending peripheral wall which is received in telescopic engagement with the lower wall portion of said housing when the housing and said base member are assembled together, and said access cover plate being removable to provide access to said mounting board, said first, second and third terminal blocks and said terminals of said receptacles from the exterior of said housing while said housing is mounted on said base plate to permit the connection of wires between said terminals of said receptacles and appropriate ones of said first, second and third terminal blocks.

* * * * *

UNITED STATES PATENT AND TRADEMARK OFFICE
CERTIFICATE OF CORRECTION

PATENT NO. : 4,307,436
DATED : Dec. 22, 1981
INVENTOR(S) : George R. Eckart and Louis A. DeBeradinis It is certified that error appears in the above—identified patent and that said Letters Patent is hereby corrected as shown below:

Column 1, line 60, change "and" to --are--.

Signed and Sealed this

Sixteenth Day of March 1982

[SEAL]

Attest:

Attesting Officer

GERALD J. MOSSINGHOFF
Commissioner of Patents and Trademarks